US006902480B2

(12) United States Patent
Kidron

(10) Patent No.: US 6,902,480 B2
(45) **Date of Patent: *Jun. 7, 2005**

(54) METHOD AND SYSTEM FOR PROVIDING ELECTRONICALLY PLACED WAGERS FOR ANOTHER

(76) Inventor: Adam E. Kidron, 30 Porter Pl., Montclair, NJ (US) 07042

(*) Notice: Subject to any disclaimer, the term of this patent is extended or adjusted under 35 U.S.C. 154(b) by 0 days.

This patent is subject to a terminal disclaimer.

(21) Appl. No.: 10/172,452

(22) Filed: Jun. 13, 2002

(65) Prior Publication Data

US 2002/0155886 A1 Oct. 24, 2002

Related U.S. Application Data

(63) Continuation of application No. 09/553,701, filed on Apr. 20, 2000, now Pat. No. 6,464,583.

(60) Provisional application No. 60/183,077, filed on Feb. 16, 2000, provisional application No. 60/130,856, filed on Apr. 22, 1999, and provisional application No. 60/130,340, filed on Apr. 20, 1999.

(51) Int. Cl.[7] .......................... G06F 17/00; G06F 19/00

(52) U.S. Cl. .......................................... 463/25; 463/42

(58) Field of Search .............................. 463/25, 40–42; 705/14, 16, 17

(56) References Cited

U.S. PATENT DOCUMENTS

| | | | | |
|---|---|---|---|---|
| 5,442,567 A | | 8/1995 | Small | |
| 5,513,117 A | * | 4/1996 | Small | 235/381 |
| 6,012,984 A | * | 1/2000 | Roseman | 463/42 |
| 6,175,823 B1 | * | 1/2001 | Van Dusen | 705/14 |
| 6,450,887 B1 | * | 9/2002 | Mir et al. | 463/42 |
| 6,464,583 B1 | * | 10/2002 | Kidron | 463/25 |

FOREIGN PATENT DOCUMENTS

| | | | |
|---|---|---|---|
| EP | 0 797 175 | 9/1997 | |
| WO | WO 99/01188 A3 * | 1/1999 | H04K/1/01 |

OTHER PUBLICATIONS

Copy of International Search Report from counterpart International application of the above–identified application (PCT/IB00/00700), 6 pages.

* cited by examiner

*Primary Examiner*—Julie Brocketti
(74) *Attorney, Agent, or Firm*—Christie, Parker & Hale, LLP

(57) ABSTRACT

A wager is placed by a first user for a second user, through a wager server. The wager is composed from a selection of events and associated odds. The wager is tracked by the wager server. Once an outcome of the wager is determined, the wager server notifies the second user. If the outcome is positive, the second user is provided the winnings of the wager, while the first user receives no monetary reward from the wager.

23 Claims, 6 Drawing Sheets

METHOD AND SYSTEM FOR PROVIDING ELECTRONICALLY PLACED WAGERS FOR ANOTHER

CROSS-REFERENCE TO RELATED APPLICATIONS

The present application is a continuation application of U.S. patent application Ser. No. 09/553,701, filed Apr. 20, 2000, U.S. Pat. No. 6,464,583, the disclosure of which is incorporated by reference as if set forth in full herein, said application claiming the benefit of U.S. Provisional Application No. 60/130,340 filed Apr. 20, 1999, U.S. Provisional Application No. 60/130,856, filed Apr. 22, 1999, and U.S. Provisional Application No. 60/183,077 filed Feb. 16, 2000, the disclosures of which are hereby incorporated by reference as if set forth in full herein.

BACKGROUND OF THE INVENTION

The present invention relates generally to electronic wagering systems and methods, and more particularly, to a system and method of creating and placing wagers as a gift by a first user using an electronic wager server such that any winnings are received by a second user, the intended recipient of the gift.

The expansion of electronic devices, such as personal computers and cellular phones, into the homes, offices, and thus "day to day" lives of the average consumers has also expanded and opened multiple and diverse avenues in entertainment and business. For instance, with the growing acceptance and maturing of the personal computer and along with it, communication media such as the satellite television and the Internet, electronic shopping has become commonplace and especially convenient for consumers. Hence, finding and ordering a gift has become even easier. However, providing a gift that is different and entertaining is not easily found.

Wagering, risking something, such as a sum of money, on an outcome of an uncertain event, is often entertaining. However, in traditional wagering environments, money is wagered by an individual on an outcome of a particular event and based on the wager and the outcome of the particular event, the individual is given or paid a particular amount of money or loses the money wagered. Therefore, the entertainment or enjoyment of the wager is usually isolated to the individual wagerer and any other persons that happen to be around the wagerer at the time. Therefore, even through the use of blossoming communication media providing a worldwide market for both consumers and retailers, the entertainment of the wager is usually shared by one individual, the wagerer.

Providing the individual to share the wagering experience to another individual may well benefit both the individual setting up the wager and the other individual.

SUMMARY OF THE INVENTION

The present invention provides an electronic wagering system in which a user or consumer, a gift giver, is able to create or select a bet or wager as a gift for another person, a gift recipient. The gift recipient is then notified of the gift giver's gift, the wager, and provided any winnings resulting from the wager.

In accordance with one aspect of the invention, a method that provides a gift wager by a first user to a second user and the method comprises composing a gift wager by a first user through a communication media, the gift wager including a particular event and a payoff associated to an outcome of the particular event. The method further comprises obtaining contact information regarding a second user, notifying the second user that a gift wager has been composed by the first user prior to the outcome of the particular event, and providing result data to the second user in response to the outcome of the particular event.

In another aspect of the invention, an electronic wager system is provided to provide a gift wager by a first user to a second user. The electronic wagering system includes communication means providing a conduit to receive input from a first user concerning a gift wager for a second user, the gift wager pertaining to a wager, a particular event, and contact data concerning a second user and computer means storing the gift wager from the first user and tracking the particular event, the computer means sending result data to the second user prior in response to an outcome of the particular event.

In another aspect of the invention, an electronic wager system includes a first user computer utilized by a first user and coupled to a first communication medium, a second user computer utilized by a second user and coupled to a second communication medium, and a wager server coupled to the first communication medium and the second communication medium. The wager server includes a memory storage in which at least one wager record is stored in the memory storage, the at least one wager record pertaining to a predetermined event, and a wager engine configured to receive information from the first user computer to compose the at least one wager record, to determine an outcome of the predetermined event and to transmit information regarding the outcome of the predetermined event to the second user computer.

Many of the attendant features of this invention will be more readily appreciated as the same becomes better understood by reference to the following detailed description considered in connection with the accompanying drawings.

DETAILED DESCRIPTION

Figure 1:
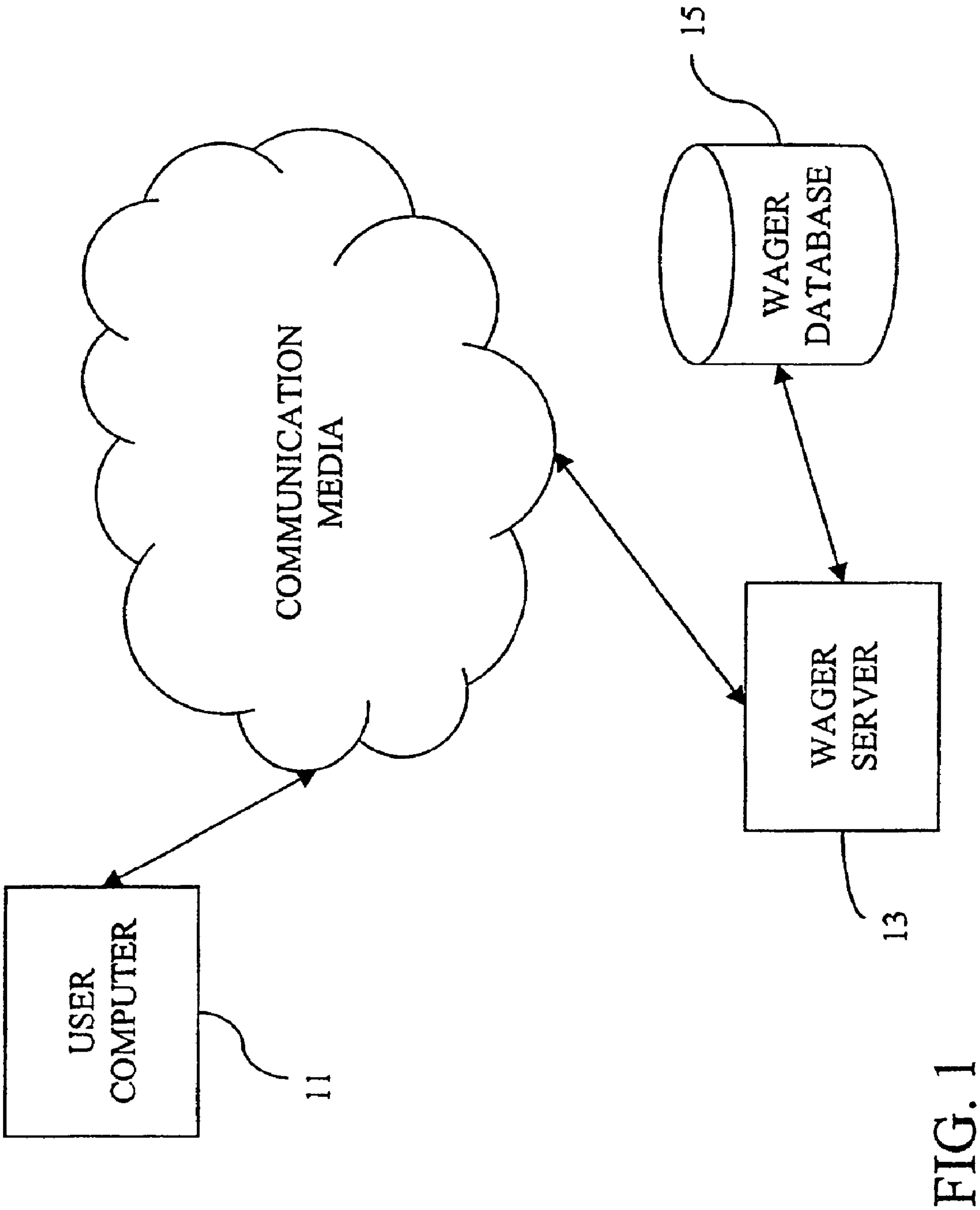
FIG. 1 illustrates a block diagram of one embodiment of the electronic wagering system.

FIG. 1 illustrates a block diagram of one embodiment of the electronic wagering system of the present invention. A user computer 11 is linked, telephonically including ISDN lines, ADSL lines and DSL lines, wireless connections, such as radio frequency transmissions and satellite transmissions, or via any other communication methods, to a number of other computers. These other computers include a wager server 13. The wager server 13, in one embodiment, is a web and database server providing administrative and other functions for the electronic wagering system. In a preferred embodiment, the wager server is a computing device having computer memory storage devices and network interface cards and operating under a UNIX operating system.

The user computer 11 may comprise a personal computer (PC), an engineering workstation, a palm computer, a cellular phone, a large mainframe computer, or any other system capable of supporting Internet and/or other types of communication media and display functions. Alternatively, a television equipped with a digital or analog set top box or a separate access terminal is used to connect to the Internet and/or the wager server. The separate access terminal includes cellular phones, wireless modems and other phone modems providing connection to the Internet and/or the wager server over a telephone network. Similarly, access to the Internet can be through television cables or satellite delivery systems. Various other devices can be used to provide access to the Internet or send an E-mail to the wager server. In another embodiment, the gift giver uses a cellular, "land-line", or wireless telephone which communicates with a telephone network or cellular network to access the wager server or a customer representative with access to the wager server. The description of the particular devices and access is exemplary and is not intended to be limiting in any sense.

In a preferred embodiment, the user computer 11 may be a low cost machine specially designed for Internet browsing. The user computer includes various application programs, including a Web browser. The Web browser retrieves information from Web servers, such as the wager server, for display on the users computer display terminal. The Web browser obtains a copy of the requested material from the wager server when a user, via the user computer, requests information from a wager server. The Web browser uses hypertext transfer protocol (HTTP) as a protocol for communicating over the Internet with the wager server. Standard TCP/IP is utilized as a protocol to communicate between the user computer and the wager server, and generally according to the Simple Mail Transfer Protocol (SMTP), SMTP being a TCP/IP protocol that operates at layers 5–7 of the Open Systems Interconnection (OSI) model. Web browsers are widely commercially available, and include MICROSOFT INTERNET EXPLORER, available from Microsoft Corporation and NETSCAPE NAVIGATOR, available from Netscape Communication Corporation, and others. Both MICROSOFT INTERNET EXPLORER and NETSCAPE NAVIGATOR are suitable web browsers for use in conjunction with the present invention, with NETSCAPE NAVIGATOR Version 4.0 and MICROSOFT INTERNET EXPLORER Version 4.0 being the preferred versions.

In one embodiment, the wager server 13 is coupled to a mass storage device, such as a hard disk drive, a redundant array of independent disks (RAID) or a group of disks, also known as "just a bunch of disks" (JBOD). The mass storage device hosts at least one database, a gift wager database 15, that contains information about wagers placed for others. The wager server is configured to access the gift wager database to store and retrieve information for the gift wager database. The information contained in the gift wager database including information about wagers placed for others is in the form of a series of records.

In one embodiment, the series of records include a gift giver record, a gift wager record and a gift recipient record. The gift giver record includes, for example, a gift giver profile including his or her e-mail address, home and/or business addresses, home and/or business numbers, an unique identification number, a history of past gift wagers, and so on. The gift giver profile can contain preferences such as preferred styles of bets, particular themes of wagers, and other similar types of information. Likewise, the gift recipient record includes a gift recipient profile including, for example, his or her e-mail address, home and/or business addresses, and home and/or business numbers, an unique identification number, a history of past gift wagers received, and so on.

The gift wager record, in one embodiment, includes pointers or logical links to an associated gift giver and gift recipient records, such as address to the records or unique identification numbers for each record. The gift wager record includes, for example, dates when the gift or bet was made, when the winnings were or will be paid, when the outcome of the wager happened or will happen, how much and to which charity will some of the winnings will go to and so on. Other information included in the gift wager record can include what theme is related to the gift wager, how much is or was the wager for, what are the odds of the wager and so on.

Figure 2:
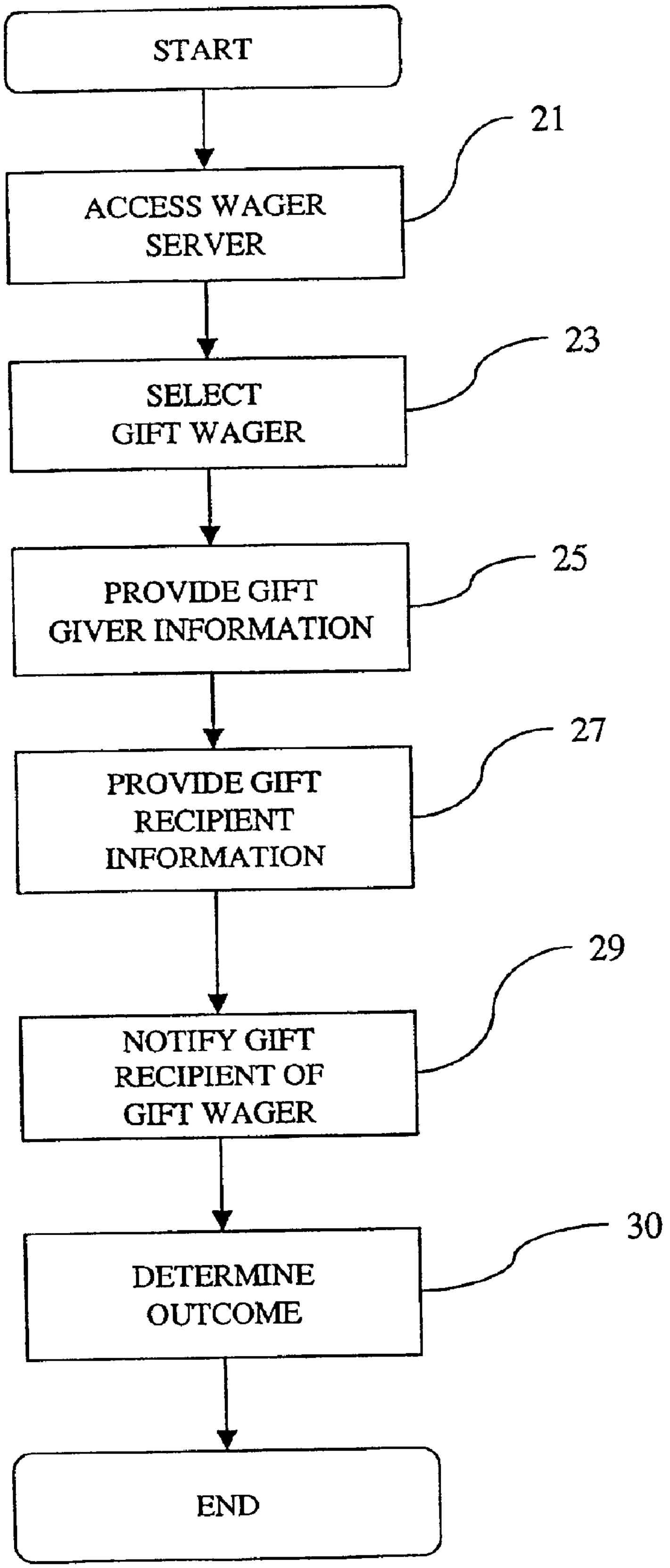
FIG. 2 illustrates a flow diagram of an operational overview of the electronic wagering system of FIG. 1.

FIG. 2 illustrates a flow diagram of an operational overview of the electronic wagering system illustrated in FIG. 1. In step 21, a gift giver through the user computer 11 accesses wager server 13. In step 23, the gift giver selects a gift wager. In step 25, the gift giver provides information about him or herself. In one embodiment the information provided about the gift giver includes the name, address, phone number and payment information, e.g., a credit card number of the gift giver. In step 27, the gift giver provides information about a gift recipient. With the gift wager prepared, the wager server, in step 29, notifies the gift recipient that a gift wager has been made. In step 30, the wager server periodically determines if the outcome of the gift wager has been determined. Once the wager server in step 30 determines that the outcome of the gift wager has been determined then the wager server notifies the gift recipient and/or the gift giver regarding the outcome and winnings, if any, of the gift wager and then process ends.

Figure 3:
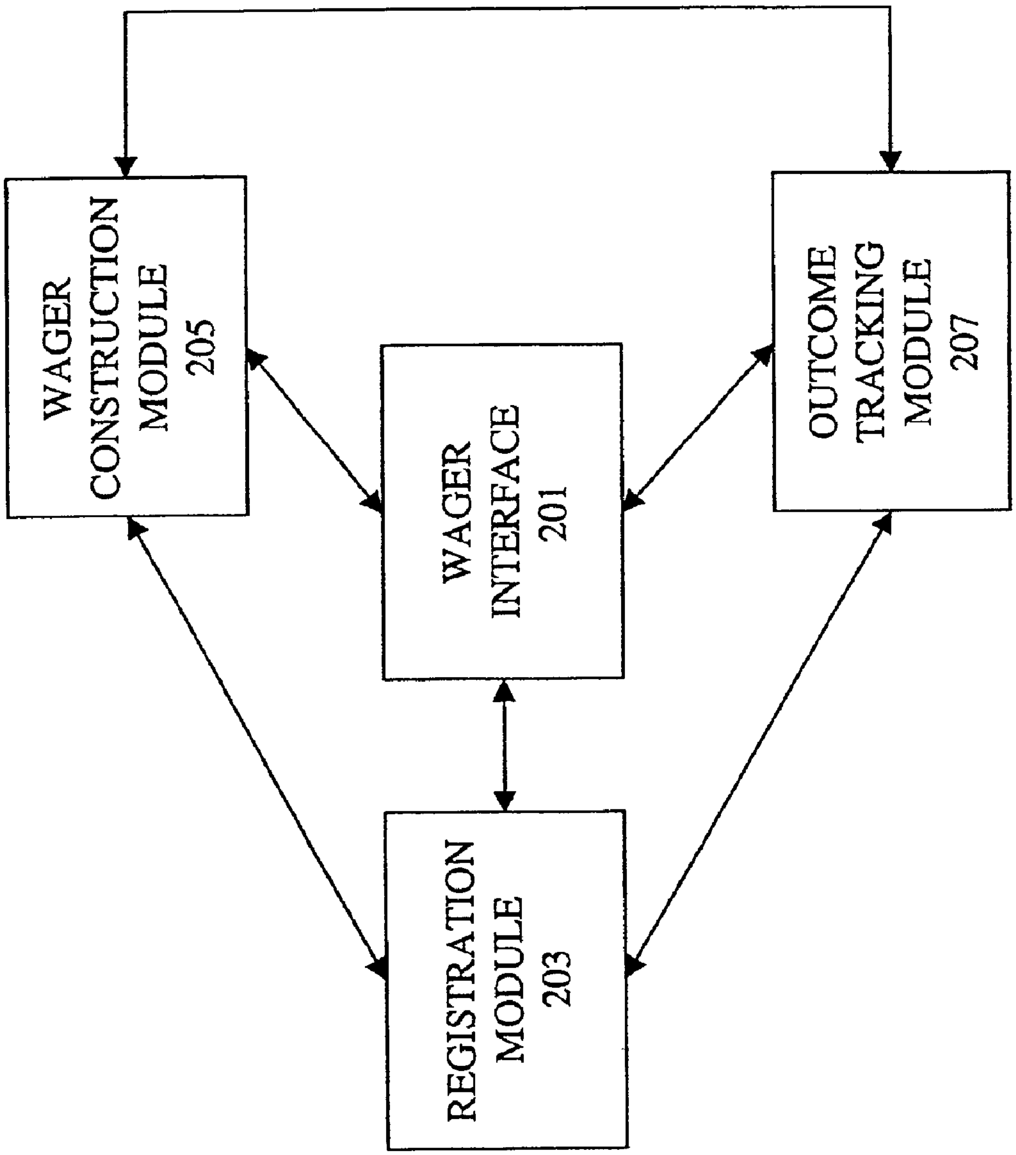
FIG. 3 illustrates a block diagram of one embodiment of a wager server of the electronic wagering system of FIG. 1.

FIG. 3 illustrates a block diagram of one embodiment of the wager server in FIG. 1. The wager server is configured to provide bi-directional communication between the user computer of the gift giver and the wager server. The wager server includes a wager interface 201 for receiving wager requests from the gift giver to allow gift givers to inform the wager server that they wish to compose a wager to be given away. The wager interface can be a Web page, an E-mail, a customer service representative or a customized or standard software interface with access to the wager server, or an automated or interactive attendant telephone switching system. In one embodiment, the wager interface requests information from the gift giver through a series of displays, user-interface windows or screens, e-mails, text prompts, voice prompts, web pages, or various other forms of user interfaces. In a preferred embodiment, the gift giver accesses the wager interface through a web page of the wager server utilizing an Internet connection.

When a gift giver accesses the wager server, in one embodiment, the wager server greets the gift giver by providing an introduction web page to the user computer of the gift giver to direct the gift giver through the process of creating a gift wager. As shown in FIG. 3, the wager server includes a registration module 203. The registration module allows gift givers to enter specific personal information pertaining to the gift giver.

In one embodiment, when the gift giver supplies the appropriate information to the registration module 203, the wager server creates a gift giver record. The registration module requests personal information from the gift giver regarding specific information about the gift giver, such as contact information and other information to populate or develop some or all of a gift giver record. In one embodiment, a form is provided by the registration module for the gift giver to provide personal information. The information is generally returned as part of a URL string, although other methods are also possible. The creation of forms and the reception of information from users by servers are well known methods to Web site developers.

In one embodiment, a gift giver record is populated or developed by the gift giver "logging in", e.g., using a name or identification number and/or a password, to the wager server. As such, the registration module 203 is able to access an old record from the gift wager database about the gift giver and thereby develop the gift giver record. In one embodiment, the registration module 203 downloads a "cookie" file to the user computer, such that personal contact information pertaining to the user remains persistent and thus permits the user to navigate between the wager server and the multitude of other web sites and/or web servers without having to re-enter the user's personal or identification information.

As further shown in FIG. 3, the wager server further includes wager construction module 205 and outcome tracking module 207. The wager construction module 205 requests information from the gift giver or provides the gift giver a series of prompts or questions to develop a gift wager. In one embodiment, the wager construction module 205 provides the gift giver a predetermined selection of gift wagers. In one embodiment, the wager construction module provides the gift giver a selection of topics or categories grouping a series of bets, such as bets on particular events such as sports, weather reports, e.g., if it will rain in Los Angeles on a particular day, and so on. The wager construction module also provides selections of odds, bet amounts or stakes, and other types of information to the gift giver to create the gift wager. Optionally, the wager construction module also provides a selection of messages to be attached to gift wager, such as an E-mail, a simple text message, or an electronic greeting card. Additionally, the wager construction module, in one embodiment, further provides the option of attaching a tangible gift, such as flowers or candy.

In one embodiment, the wager construction module accesses a gift and message server. The gift and message server, in one embodiment, is a computing device, such as a server, workstation, or personal computer. In one embodiment, the gift and message server and the wager server are one in the same and/or the outcome database is included with the gift wager database. The gift and message server provides information to the wager construction module to direct the gift giver through the process of selecting or creating a gift and/or message, and attaching the gift and/or message, such as an electronic greeting card, E-mail or another type of communique.

The gift and message server prepares the message and gift for viewing by the gift giver and eventually the gift recipient, and stores the viewable message and gift in a gift and message viewing storage. In one embodiment, the gift and/or message are stored as records in the gift wager database and linked to or associated with the gift wager record for the gift wager created by the wager construction module.

In one embodiment, the wager construction module of the wager server releases control to the gift and message server to direct the gift giver through the gift and/or message selection process. Once, the gift giver completes the gift and/or message selection process, the gift and message server releases control back to the wager server. In one embodiment, the gift and/or message selection process begins with the gift giver being provided a selection of topics of different types of gifts and/or messages. In one embodiment, the series of topics provided relate to the gift wager, holidays or special occasions, or other types of common interests.

The gift and message server provides a selection of gifts, such as candies, flowers, perfume or other types of retail items, and messages, such as electronic or conventional greeting cards, postcards, voice mails, and other types of correspondence, based on the topic chosen. The gift giver is provided an option to customize the gift or message, such as adding or modifying the specific greeting on the message or color of the gift. The gift and message server also provides an option to preview the message or gift in which the gift and message server displays the message or gift. The gift giver is also provided the option to attach additional gifts and messages. In one embodiment, the gift and message server provides a verification stage for the gift giver to verify the previously provided information. If the gift giver wishes to change any information provided, gifts or messages attached, the gift and/or message selection process is repeated. The gift and message server then attaches the gifts and/or messages to the gift wager, by associating or adding the information about the gifts and/or messages to the gift wager record in the gift wager database. Once the gift and/or message selection process ends, the gift and message server releases control back to the wager server, e.g., the wager construction module.

The wager construction module 205 also requests information about the gift recipient, such as contact information and other information to populate or develop some or all of a gift recipient record. In one embodiment, a gift recipient record is populated or developed by the gift giver selecting, browsing or searching for a name, nickname, or another identifying mark for the gift recipient as provided by the wager server in an address book or another type of contact list. Therefore, the wager construction module 205 with the information gathered from the gift giver is able to populate or develop a gift wager record with links to the gift giver record, information identifying the gift giver, and the gift recipient record, information identifying the gift recipient.

Figure 4:
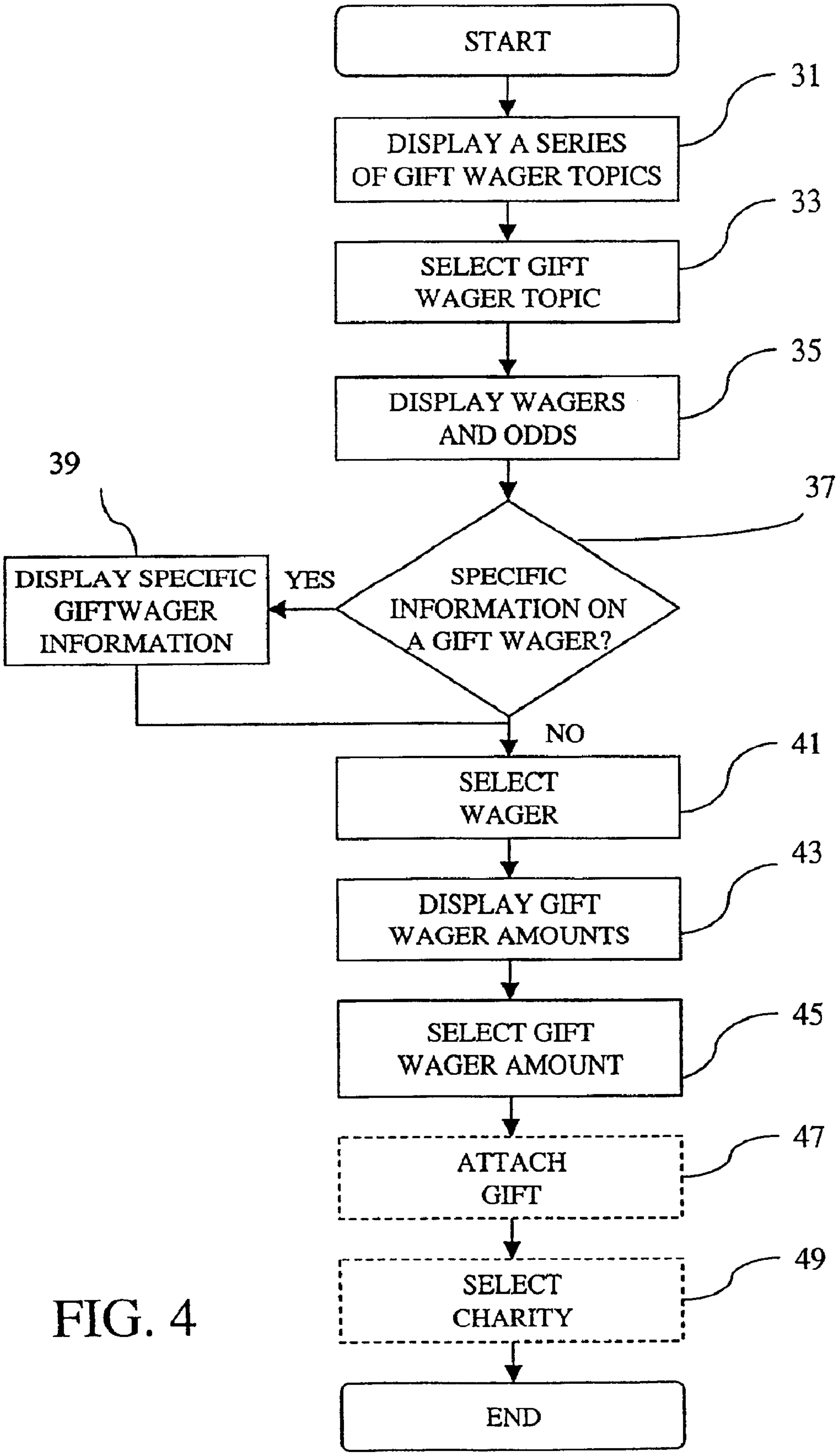
FIG. 4 illustrates a flow diagram of a process of creating a wager by a wager construction module of the wager server of FIG. 3.

FIG. 4 illustrates a flow diagram of one embodiment of the wager construction module 205 of FIG. 3, creating a gift wager. In step 31, the wager construction module provides a series of topics or categories of different gift wagers along with a series of specific gift wagers. In one embodiment, the series of topics provided relate to, sporting events, weather reports, or other similar outcome-based programming. In step 33, the gift giver selects a gift wager topic. In step 35, the wager construction module in response to the gift wager topic being selected displays a selection of wagers and odds associated with the wagers displayed.

In step 37, if the gift giver wants specific information on a particular gift wager, then, if available, the wager construction module provides or displays a description of a specific gift wager to the user computer in step 39. For example, a display, voice message, web page and the like could provide a description of a specific gift wager including the odds and other specific information. In another example, a display, voice message, web page and the like could provide a description of how to obtain information about a specific gift wager including the odds and other specific information. If the gift giver does not want specific information on a particular gift wager or if no specific information is available, then the gift giver selects a wager in step 41. The wager construction module then displays a range of gift wager amounts for selection by a gift giver in step 43. In one embodiment, the gift wager amounts range from ten dollars to a hundred dollars. Alternatively, in step 43 and 45, the gift giver selects or inputs a specific gift wager amount.

In step 47, the gift giver is given a choice to attach a gift and/or a message to the gift wager to be sent to the gift recipient (optional). Also, optionally, in step 49, the gift giver is given a choice by the wager server to choose a charity and then the process ends. The charity chosen receives a portion of the gift wager amount selected by the gift giver in step 45. Upon completion of the process, the wager construction module in one embodiment, creates or populates a wager record based on the information gathered through the process described and stores the wager record in the gift wager database.

In one embodiment, the wager server provides a verification stage for the gift giver to verify the previously provided or selected information by the gift giver or wager server concerning, for example, the gift giver, the gift wager and/or the gift recipient. If the gift giver wishes to change the information provided, the wager server provides the gift giver an option to re-input or modify the provided or selected information otherwise the process ends.

Referring back to FIG. 3, in one embodiment, the outcome tracking module 207 requests information from thee gift giver about how the gift wager should be transmitted to the gift recipient. In another embodiment, the outcome tracking module 207 is configured to transmit the information about the gift wager to the gift recipient via a predetermined manner. In one embodiment, notification information about the gift wager can be transmitted via E-mail. Thus, the outcome tracking module is able to notify the gift recipient that a wager, any attached messages and/or gifts for the gift recipient has been made by a gift giver. Similarly, in one embodiment, the outcome tracking module is configured to provide additional information, via E-mail, pertaining to details required to access additional information about the gift wager or winnings associated with the gift wager from the wager server.

In a preferred embodiment, the E-mail, provided to the gift recipient by the outcome tracking module 207, includes a Uniform Resource Locator (URL) designating a specific location of information on the Internet. The URL is a string expression representing a location identifier on the Internet or on a local Transmission Control Protocol/Internet Protocol (TCP/IP) computer system. The location identifier generally specifies the location of a server on the Internet, the directory on the server where specific files containing information are found, and the names of the specific files containing information. Certain default rules apply so that the specific file names, and even the directory containing the specific files, need not be specified. Thus, the user may enter the URL on the user's computer in conjunction with execution of the browser software to obtain the desired information from a particular Web server to view the gift wager created, attached gifts and/or messages.

In another embodiment, the gift wager notification and access information can be transmitted via a voice mail message or by a customer representative over a telephone network. In one embodiment, the outcome tracking module triggers an automated telephone system to place a telephone call to the gift recipient providing notification and access information about the gift wager, attached gifts and/or messages or providing a link, such as a number to contact or an web address to access in order to obtain notification and access information about the gift wager, attached gifts and/or messages, through, for example, an automated voice recording.

In other embodiments, the outcome tracking module 207 provides pager and/or cellular phone messaging or notifications, such as numeric and alphanumeric messages, voice mails, Internet connection messaging, such as instant messages and/or banner advertising, or specific propriety or public service provider connections, such as electronic programing guide providers through, for example, a vertical blanking interval in a television signal, or specific advertising by Internet service providers, and various other forms of electronic transmission and communications is utilized to provide notification and/or access information about the gift wager, attached gifts and/or messages or providing a pointer or link to access and obtain notification and access information about the gift wager, attached gifts and/or messages. In another embodiment, the notification and/or access information about the gift wager, attached gifts and/or messages is provided via mail, delivery service, or another nonelectronic method of transmission.

Furthermore, in most cases, the gift wager placed by the gift giver for the gift recipient has not matured. In other words, the outcome is yet to be determined. In this case, reminder communications, such as E-mails, voice messages and the like and the other forms of communication described above for the notification and access information, are sent to the gift recipient by the outcome tracking module to periodically inform or to check the outcome of the gift wager. Using the name and password provided to the gift recipient as described above, the gift recipient at a later time, is able to periodically check the status of the gift wager. Additionally or in the alternative, an outcome communication, such as an E-mail, voice message, and the like and the other forms of communication described above for the notification and access information, is sent to the gift recipient and/or gift giver once the gift wager has matured.

Furthermore, in one embodiment, a receipt is sent, via the above-mentioned forms of communication described for the notification, access, reminder, and outcome information, to the gift giver containing information about the gift wager created by the wager construction module 205. In one embodiment, the information provided includes the type of gift wager and the amount charged to the gift giver's credit card and/or other payment type information. Once, the gift recipient accesses and/or views the gift wager, a received notification is sent by the outcome tracking module 207 to the gift giver to notify the gift giver that the gift wager created has been accessed and/or viewed by the gift recipient.

In one embodiment, the outcome tracking module 207 determines if the outcome of the gift wager has been established by checking an outcome database that includes status records. The status records include information about a particular event or events, such as a football game, total number of rushing yardage by a particular team in the football game, and so on, the outcome(s) or final result(s) of the particular event(s) and the like. The status records could further include pointers or links or unique identification number to various gift wager records created in the gift wager database. In one embodiment, gift wager records include links or unique identification numbers to the various status records.

In one embodiment, the status records are managed and updated manually by an authorized administrator of the outcome database. In another embodiment, the status records are managed by a status server. The status server, in one embodiment, is a computing device, such as a server, workstation, or personal computer. The status server is coupled to a mass storage device, such as a hard disk drive, a RAID or a JBOD. The mass storage device hosts the outcome database. In one embodiment, the status server and the wager server are one in the same and/or the outcome database is included with the gift wager database. Also, the mass storage device coupled to the status server could be the same mass storage device coupled to the wager server.

In another embodiment, the status server is a service or content provider containing a digital feed of real-time and/or periodically updated information concerning events relevant to one or more gift wagers. The service provider could include a news service, a sports news service and the like. In another embodiment, the final results of the events for each status record could be updated manually as the information becomes available.

Figure 5:
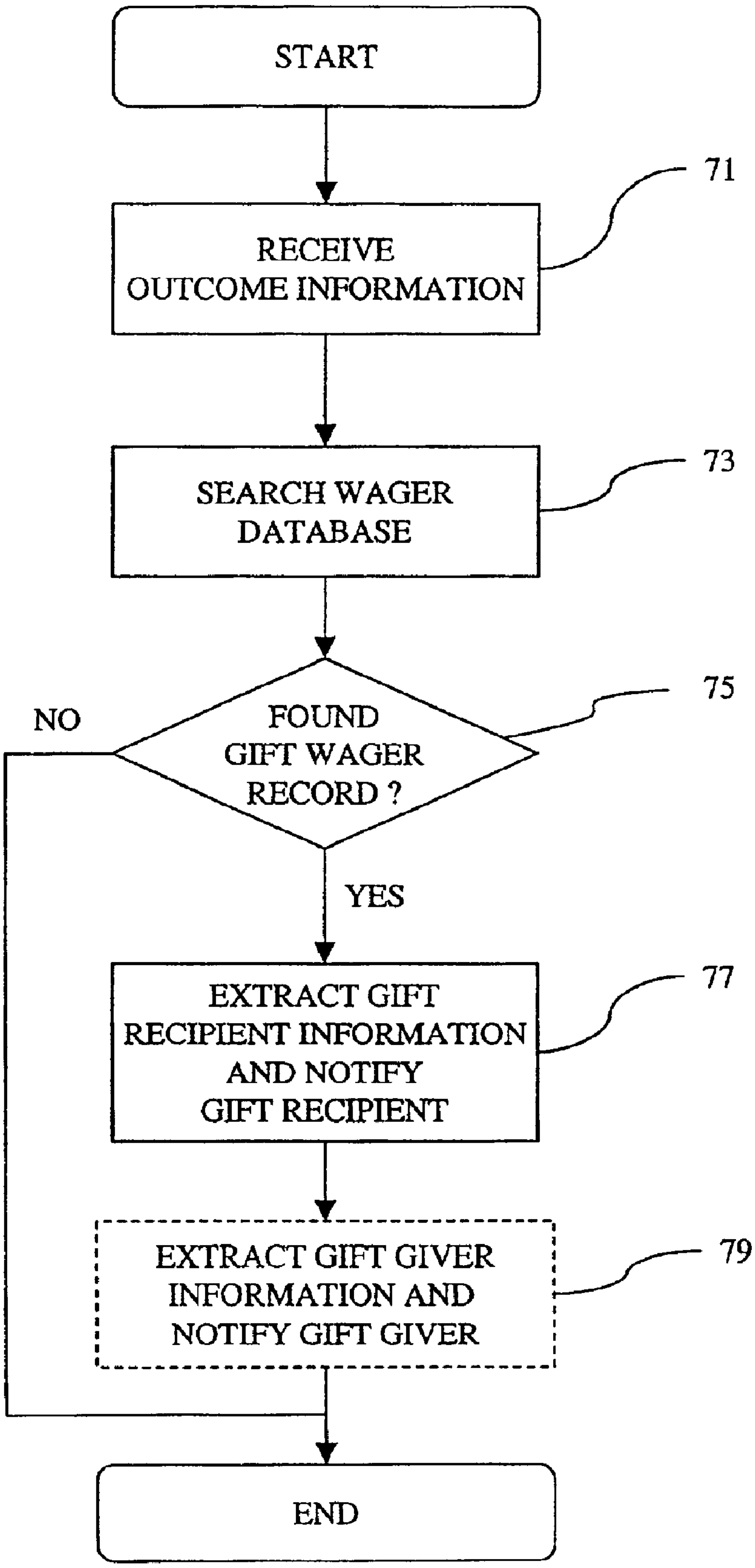
FIG. 5 illustrates a flow diagram of a process of notifying a gift recipient and/or a gift giver concerning the outcome of the gift wager by an outcome tracking module of the wager server of FIG. 3.

FIG. 5 illustrates a flow diagram of one embodiment of the outcome tracking module 207 of FIG. 3, notifying a gift recipient and/or a gift giver concerning the outcome of a gift wager. In step 71, the outcome tracking module receives information pertaining the outcome of a particular event, such as a final score of a football game. In another embodiment, the outcome tracking module periodically searches the outcome database for the outcome of a particular event. In step 73, the outcome tracking module searches the gift wager database to locate the gift wager record or records that pertain to the particular event in which an outcome has been determined. In step 75, if the outcome tracking module search finds the gift wager record or records, the outcome tracking module extracts the associated gift recipient information in step 77. In one embodiment, the gift wager record or records include links to associated gift recipient records containing gift recipient information. Also, in step 77, the outcome tracking module notifies the associated gift recipient or gift recipients with result data pertaining to the outcome of the particular event and thus associate gift wager(s).

Optionally, in step 79, the outcome tracking module also extracts the associated gift giver information. In one embodiment, the gift wager record or records include links to associated gift giver records containing gift giver information. Thus, also, in step 79, the outcome tracking module notifies the associated gift giver or gift giver with result data pertaining to the outcome of the particular event and thus associate gift wager(s). If, in step 75, the outcome tracking module search does not find a gift wager record pertaining to the particular event in step 71, the process ends. Thus, once the outcome of the gift wager is determined, the gift recipient and/or the gift giver is notified of the outcome, whether the outcome is favorable or unfavorable.

If the determined outcome of the gift wager is favorable, e.g., the bet is that team A will win game Y and team A does win game Y, then the wager server determines the winnings or payoff owed to the gift recipient. The outcome tracking module 207 determines the winnings based on predetermined odds associated with the gift wager or other similar predetermined tables or calculations to assess the winnings. The gift recipient is provided the winnings of the gift wager in various ways. In one embodiment, the gift recipient is sent a check or other similar types of payment via mail for the amount of winnings of the gift wager. In one embodiment, the gift recipient is provided information about how to obtain the winnings of the gift wager via mail, E-mail, voice message(s), similar forms of communication as described above for the notification and access information, or other similar forms of communication.

In one embodiment, the wager server or the status server creates and sends an E-mail to the gift recipient notifying the gift recipient of his/her winnings and providing the gift recipient a unique winning identification number. In one embodiment, the unique winning identification number is linked or associated with the gift recipient record, the gift giver record and the gift wager record in the gift wager database. Using this unique winning identification number to identify the gift recipient and/or the gift wager to the wager server or status server, the gift recipient can provide further contact information in order for the gift recipient to receive his/her winnings.

In a preferred embodiment, the wager server creates and sends an E-mail to the gift recipient notifying the gift recipient of his/her winnings and providing the gift recipient a winning URL identifying unique internet location and including a unique winning identification number. Using the winning URL, the gift recipient is able to access the wager server that is configured to recognize the unique winning identification number included in the winning URL. Upon recognition of the unique identification number, the wager server retrieves the gift wager record from the gift wager database that is associated with the unique identification number to provide additional information or options in order for the gift recipient to receive his/her winnings.

In one embodiment, the gift recipient is provided a coupon, voucher, or certificate in which the gift recipient must redeem at a specified location and/or time to receive the winnings of the gift wager. In one embodiment, the gift recipient is provided a certificate or credit in which the gift recipient can use to purchase various products or services at various business establishments. In one embodiment, the gift recipient is provided electronic cash or electronic credit in which the gift recipient can use to purchase various products or services at various on-line business establishments. In one embodiment, the gift recipient is provided credit with the electronic wagering system. Thus, the gift recipient may then use the credit to create a gift wager, such that the gift recipient now becomes the gift giver.

Also, if a charity was previously selected by the gift giver, all or a portion of the winnings, as previously indicated by the gift giver, are set aside for the selected charity. As with the gift recipient, all or a portion of the winnings for the charity are similarly provided to the selected charity. In one embodiment, periodic payments such as monthly or bi-monthly payments are made to the selected charity in which all winnings for all the gift wagers made during a predetermined period are paid in one lump sum. All the various ways described above to provide the winnings of the gift wager to the gift recipient and/or the selected charity, can be performed via mail, E-mail, voice messages, similar forms of communication as described above for the notification and access information, other types of electronic communication and so forth. Furthermore, the described manners in which the winnings of the gift wager are provided are similarly used to provide the attached gifts and/or messages to the gift recipient.

Figure 6:
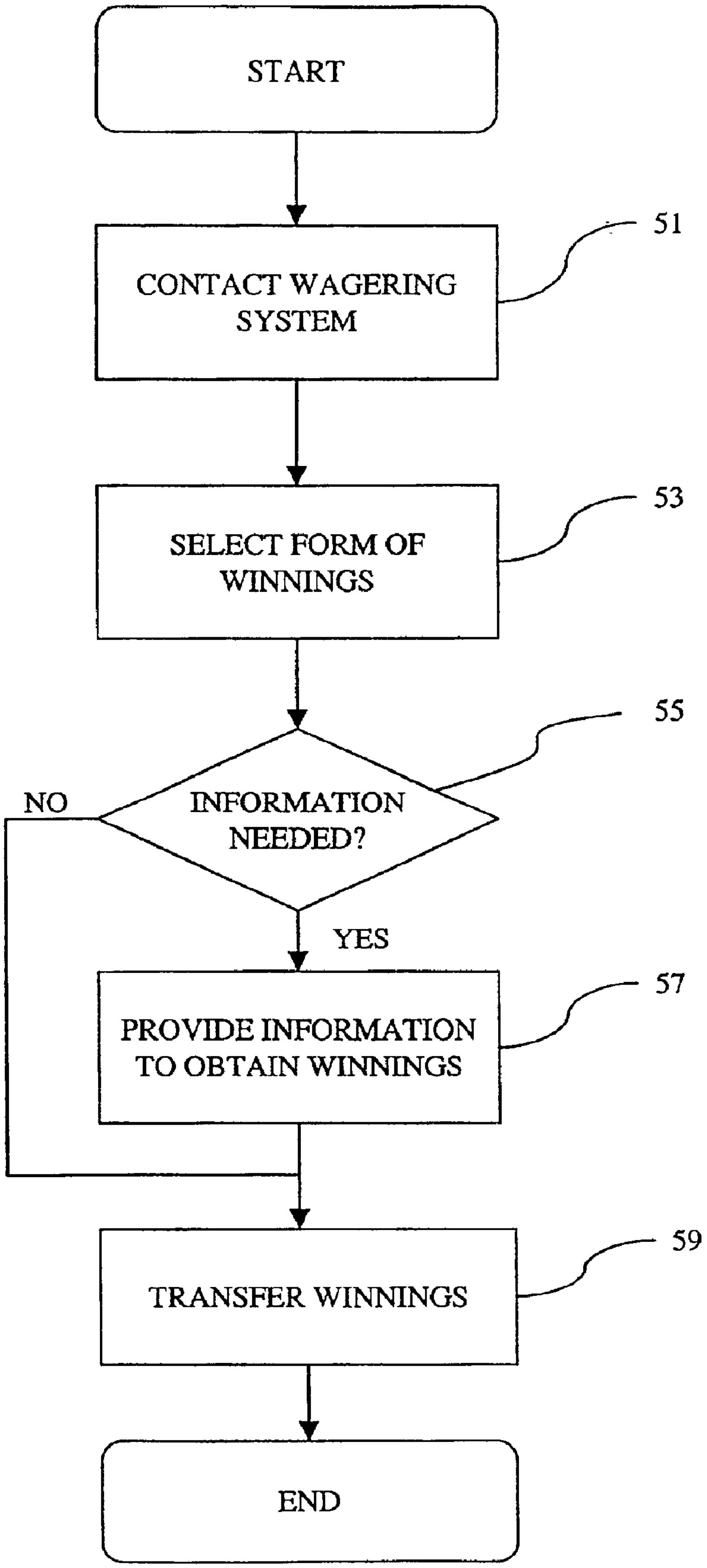
FIG. 6 illustrates a flow diagram of a process of accessing winnings provided for a gift wager by a gift recipient by the outcome tracking module of the wager server of FIG. 3.

FIG. 6 illustrates a flow diagram of one embodiment of a gift recipient obtaining the winnings of a gift wager. In step 51, the gift recipient accesses the wager server or the status server. In one embodiment, the gift recipient accesses the wager or status server using the winning URL. In another embodiment, the gift recipient accesses the wager or status server using a login procedure by providing the wager or status server a unique identification number or a name and password. As described above, the unique identification number or name and password could be provided previously by the wager or status server upon notifying the gift recipient about the outcome and winnings of the gift wager by the outcome tracking module 207.

In one embodiment, once the gift recipient accesses the wager or status server, the wager server searches the gift wager database to retrieve the gift wager record pertaining to the gift wager and the associated gift giver and gift recipient records. The wager server extracts the contact information of the gift giver from the gift giver record. Using the contact information is of the gift giver, such as an E-mail address, the wager server notifies the gift giver, such as sending an access notification E-mail, that the gift recipient has accessed the gift wager for obtaining more information or to obtain winnings as a result of the gift wager.

In step 53, the gift recipient selects a way of obtaining the winnings, for instance, as a credit or certificate, a check mailed to the gift recipient and the like. In one embodiment, the form of the winnings, e.g., a credit or certificate, is predetermined. In step 55, the wager or status server determines if the gift recipient needs to provide information such as an address, phone number, and the like to receive the winnings. If the wager or status server determines that the gift recipient needs to provide information, then in step 57, the wager or status server requests and receives the required information from the gift recipient. However, if the wager or status server determines that the gift recipient does not need to provide any information or after the gift recipient provides the requested information, then the winnings of the gift wager are prepared and sent to the gift recipient, in step 59, and then the process ends.

In one embodiment, the wager interface, the registration module, the outcome tracking module and other functions of the wager server comprise programs in the C or C++ programming language or scripts in the PERL (Version 5.0) programming language. C and C++ compilers, PERL interpreters and the C, C++ and PERL programming languages, and the uses thereof, are well known and often used by Web and software developers. Furthermore, even though the wager interface, the registration module, and the outcome tracking modules are described as separate items, all the modules could be combined as a single program or hard-wired in the wager server, separately or as one. Also, although a gift giver, gift wager, gift recipient and wager server are described in a singular sense, one skilled in the art would recognize that two or more gift givers, gift wagers, gift recipients, and wager servers and any combination thereof, e.g., a single gift giver, a single gift wager, three gift recipients and two wager servers, could be included in the present invention and likewise each could be provided separately.

Accordingly, the present invention provides a system and method of creating and placing wagers as a gift by a first user using a wager server such that any winnings are received by a second user, the intended recipient of the gift. Although this invention has been described in certain specific embodiments, many additional modifications and variations would be apparent to those skilled in the art. It is therefore to be understood that this invention may be practiced otherwise than is specifically described. Thus, the present embodiments of the invention should be considered in all respects as illustrative and not restricted, the scope of the invention to be indicated by the appended claims rather than the foregoing description.

What is claimed is:

1. A method of providing a gift wager by a first user to a second user, the method comprising:

selecting a particular event, an outcome of the particular event and a wager amount by the first user to compose a gift wager by the first user through a communication media, the gift wager including the particular event and a payoff associated to the outcome of the particular event;

obtaining contact information regarding a second user;

notifying the second user that a gift wager has been composed by the first user prior to the outcome of the particular event; and providing result data to the second user in response to the outcome of the particular event.

2. The method of claim 1 further comprising identifying the first user through a first user computer coupled to the communication media, the first user providing payment information for the gift wager composed.

3. The method of claim 1 further comprising:

inputting the outcome of the particular event; and pretrieving a wager record that corresponds to the outcome of the particular event inputted.

4. The method of claim 3 wherein providing result data further comprises extracting contact information of the second user from a second user record associated with the wager record retrieved and notifying the second user concerning the outcome of the particular event inputted, utilizing the contact information extracted.

5. The method of claim 3 further comprising providing result data to the first user by extracting contact information of the first user from a first user record associated with the wager record retrieved and notifying the first user concerning the outcome of the particular event inputted, utilizing the contact information extracted.

6. The method of claim 1 further comprising:

retrieving results pertaining to the outcome of the particular event from a digital feed having information concerning outcomes for a plurality of events including the particular event; and retrieving a wager record that corresponds to the outcome of the particular event determined.

7. The method of claim 6 wherein providing result data further comprises extracting contact information of the second user from a second user record associated with the wager record retrieved and notifying the second user concerning the outcome of the particular event determined by the retrieved results, utilizing the contact information extracted.

8. The method of claim 6 further comprising providing result data to the first user by extracting contact information of the first user from a first user record associated with the wager record retrieved and notifying the first user concerning the outcome of the particular event determined by the retrieved results, utilizing the contact information extracted.

9. The method of claim 1 further comprising providing result data to the first user in response to the outcome of the particular event.

10. The method of claim 1 further comprising providing receipt information to the first user upon the second user obtaining the winnings associated with the outcome of the particular event.

11. The method of claim 1 wherein providing the result data to the second user further comprises notifying the second user of the payoff for the gift wager.

12. The method of claim 1 wherein providing the result data to the second user comprises providing the result data to the second user in response to the outcome of the particular event and prior to a game being played by the second user.

13. The method of claim 1 wherein providing the result data to the second user comprises providing the result data to the second user in response to the outcome of the particular event and prior to an action being performed by the second user before the outcome of the particular event.

14. The method of claim 1 wherein providing the result data to the second user comprises providing the result data to the second user in response to the outcome of the particular event and prior to an action being performed by the second user after the outcome of the particular event.

15. An electronic wagering system to provide a gift wager by a first user to a second user comprising:

communication means providing a conduit to receive input from a first user concerning a gift wager for a second user, the gift wager pertaining to a wager, a particular event, and contact data concerning a second user, and the received input comprises a selection of the particular event, an outcome of the particular event, and a wager amount; and computer means storing the gift wager from the first user and tracking the particular event, the computer means sending result data to the second user prior and in response to an outcome of the particular event.

16. The system of claim 15 wherein the computer means is configured to extract contact data concerning the second user from the gift wager and to notify the second user concerning the outcome of the particular event, utilizing the contact data extracted.

17. The system of claim 15 wherein the computer means is configured to notify the first user concerning the second user obtaining winnings associated with the outcome of the particular event upon the second user obtaining the winnings associated with the outcome of the particular event.

18. The system of claim 15 wherein the computer means is configured to extract contact data concerning the first user from the gift wager and to notify the first user concerning the outcome of the particular event, utilizing the contact data extracted.

19. The system of claim 15 wherein the computer means sending the result data to the second user further comprises the computer means notifying the second user of a payoff for the gift wager.

20. The system of claim 15 wherein the computer means sending the result data to the second user comprises the computer means sending the result data to the second user in response to the outcome of the particular event and prior to the second user communicating with the computer means before the outcome of the particular event.

21. The system of claim 15 wherein the computer means sending the result data to the second user comprises the computer means sending the result data to the second user in response to the outcome of the particular event and prior to a game being played by the second user.

22. The system of claim 15 wherein the computer means sending the result data to the second user comprises the computer means sending the result data to the second user in response to the outcome of the particular event and prior to an action being performed by the second user before the outcome of the particular event.

23. The system of claim 15 wherein the computer means sending the result data to the second user comprises the computer means sending the result data to the second user in response to the outcome of the particular event and prior to an action being performed by the second user after the outcome of the particular event.

* * * * *